United States Patent
Sugishita et al.

(10) Patent No.: US 6,389,797 B1
(45) Date of Patent: May 21, 2002

(54) GAS TURBINE COMBINED CYCLE SYSTEM

(75) Inventors: Hideaki Sugishita; Hidetaka Mori; Kazuo Uematsu, all of Takasago; Hideo Matsuda, Tokyo, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/697,136

(22) Filed: Oct. 27, 2000

(30) Foreign Application Priority Data

Nov. 25, 1999 (JP) .......................................... 11-333795
Jul. 12, 2000 (JP) ....................................... 2000-210897

(51) Int. Cl.⁷ ............................. F02C 6/00; F02C 7/224
(52) U.S. Cl. ...................... 60/39.182; 60/736; 60/39.75
(58) Field of Search .............................. 60/39.182, 736, 60/39.75

(56) References Cited

U.S. PATENT DOCUMENTS

| | | | | |
|---|---|---|---|---|
| 4,099,374 A | * | 7/1978 | Foster-Pegg | 60/39.182 |
| 4,891,937 A | * | 1/1990 | Noguchi et al. | 60/39.182 |
| 4,932,204 A | * | 6/1990 | Pavel et al. | 60/736 |
| 5,357,746 A | * | 10/1994 | Myers et al. | 60/39.182 |
| 5,802,841 A | * | 9/1998 | Maeda | 60/39.182 |
| 5,826,430 A | * | 10/1998 | Little | 60/736 |
| 6,089,012 A | * | 7/2000 | Sugishita et al. | 60/736 |

FOREIGN PATENT DOCUMENTS

| | | |
|---|---|---|
| JP | 10-131719 | 5/1998 |
| JP | 11-002105 | 1/1999 |

* cited by examiner

Primary Examiner—Ted Kim
(74) Attorney, Agent, or Firm—Wenderoth, Lind & Ponack, L.L.P.

(57) ABSTRACT

Gas turbine combined cycle system is improved to enhance gas turbine efficiency and combined efficiency by effecting steam-cooling of combustor tail tube and turbine blades. In the combined cycle system comprising; gas turbine (8) having generator (1), compressor (2), combustor (3), blade cooling air cooler (4), fan (5) and turbine (6); steam turbine (29) having high pressure turbine (21), intermediate pressure turbine (22) and low pressure turbine (23); and waste heat recovery boiler (9), saturated water of intermediate pressure economizer (12) is partially led into fuel heater (30) for heating fuel and the water cooled thereby is supplied to feed water heater (10). Steam of intermediate pressure superheater (16) is led into the combustor tail tube for cooling thereof and the steam is then supplied to inlet of the intermediate pressure turbine (22). Steam of outlet of the high pressure turbine (21) is led into the turbine (6) for cooling blades thereof and the steam used for cooling stationary blades is supplied to the inlet of the intermediate pressure turbine (22) and the steam used for cooling moving blades is supplied to reheater (20). Thus, the efficiency is enhanced.

18 Claims, 14 Drawing Sheets

GAS TURBINE COMBINED CYCLE SYSTEM

BACKGROUND OF THE INVENTION

1. Field of the Invention

The present invention relates generally to a gas turbine combined cycle system and more particularly to a gas turbine combined cycle system in which heating of fuel and cooling of gas turbine moving blade and stationary blade cooling air are carried out by steam generated at a waste heat recovery boiler so as to enhance an efficiency.

2. Description of the Prior Art

FIG. 14 is a system diagram of a gas turbine combined cycle system in the prior art. In FIG. 14, the prior art combined cycle system is constructed by a gas turbine 8, a waste heat recovery boiler 9 and a steam turbine 29. In the gas turbine 8, suction air is taken into a compressor 2 to be compressed to a predetermined pressure and while the compressed air is partially used for cooling of gas turbine blades, the most part thereof is led into a combustor 3 to be mixed with fuel for generation of a high temperature gas. The high temperature gas enters a turbine 6 to expand for work and a turbine output after deduction of a compressor output generates an electric power at a generator 1.

While outlet air of the compressor 2 is partially used for blade cooling in the turbine 6, this air, having a high temperature, is cooled to a predetermined temperature at a blade cooling air cooler 4 using a cooling fan 5 and is then used for the turbine blade cooling. Thus, the air so led from the compressor 2 is once cooled at the blade cooling air cooler 4 using the cooling fan 5 to be then supplied into the turbine 6. By this cooling using the cooling fan 5, heat of the blade cooling air cooler 4 is discharged outside in vain and this has caused a reduction in the thermal efficiency of the gas turbine and the combined cycle system (gas turbine efficiency and combined efficiency). It is to be noted that the fuel is supplied into the combustor 3 without being preheated.

On the other hand, as for the waste heat recovery boiler 9, outlet steam of a low pressure turbine 23 is converted into water from steam at a condenser 25. Then, the water is pressurized at a feed water pump 26 and heated at a feed water heater 10 to become a saturated water. This saturated water is separated into three systems of water. The first one becomes a saturated steam at a low pressure evaporator 11 and becomes a superheated steam at a low pressure superheater 15 and is then supplied to an inlet of the low pressure turbine 23. The second one is pressurized to a predetermined pressure at an intermediate pressure pump 28, becomes a saturated water at an intermediate pressure economizer 12, becomes a saturated steam at an intermediate pressure evaporator 14 and becomes a superheated steam at an intermediate pressure superheater 16 and is then supplied to an inlet of a reheater 20.

And the third one is pressurized to a predetermined pressure at a high pressure pump 27, becomes a saturated water at a first high pressure economizer 13 and a second high pressure economizer 17, becomes a saturated steam at a high pressure evaporator 18 and becomes a superheated steam at a high pressure superheater 19 and is then led into a high pressure turbine 21. The mentioned superheated steam enters the high pressure turbine 21, the intermediate pressure turbine 22 and the low pressure turbine 23, respectively, to expand for generating an output and this output is converted into an electric power at a generator 24.

As mentioned above, in the prior art gas turbine combined cycle system, the fuel is supplied into the combustor without being preheated and the compressed air from the compressor is partially led into the blade cooling air cooler to be cooled and is then supplied for cooling of the gas turbine moving blades and stationary blades. Cooling of the combustor is also done by cooling air. The air for cooling the blades is once cooled at the blade cooling air cooler using the cooling fan and the heat obtained by the cooling is discharged outside in vain and this has caused a reduction in thermal efficiency of the gas turbine and the combined cycle system.

SUMMARY OF THE INVENTION

In view of the mentioned problem in the prior art, therefore, it is an object of the present invention to provide a gas turbine combined cycle system in which fuel to be supplied into a gas turbine combustor is preheated by steam taken from a waste heat recovery boiler, a combustor tail tube is cooled by the steam taken from the waste heat recovery boiler in place of air and gas turbine moving blades and stationary blades are also cooled by the steam taken from the waste heat recovery boiler and further the steam after used for cooling the combustor tail tube or the gas turbine moving blades and stationary blades is recovered to be recycled so that efficiency of the gas turbine and the combined cycle system may be enhanced.

In order to achieve the mentioned object, the present invention provides means of the following (1) to (13):

(1) A gas turbine combined cycle system comprising; a steam turbine having a high pressure turbine, an intermediate pressure turbine and a low pressure turbine; a condenser for condensing exhaust steam of the low pressure turbine of the steam turbine; a gas turbine having a compressor for compressing air, a combustor for combusting fuel with the air coming from the compressor and a turbine for expanding a high temperature combustion gas coming from the combustor for driving a generator; a cooling system for cooling the combustor and blades of the turbine; and a waste heat recovery boiler having components of a feed water heater, an intermediate pressure economizer, a low pressure superheater, an intermediate pressure superheater, a high pressure superheater, a high pressure evaporator and a reheater and being fed with exhaust gas of the gas turbine so that condensed water coming from the condenser may be heated and vaporized via the components of the waste heat recovery boiler for supplying steam to the high pressure, intermediate pressure and low pressure turbines, respectively, characterized in that there is provided a fuel heater for heating the fuel before the fuel enters the combustor and saturated water coming from the intermediate pressure economizer of the waste heat recovery boiler is partially diverged to flow to the fuel heater for heating the fuel and the saturated water so used for heating the fuel is supplied to an inlet of the feed water heater.

(2) A gas turbine combined cycle system comprising; a steam turbine having a high pressure turbine, an intermediate pressure turbine and a low pressure turbine; a condenser for condensing exhaust steam of the low pressure turbine of the steam turbine; a gas turbine having a compressor for compressing air, a combustor for combusting fuel with the air coming from the compressor and a turbine for expanding a high temperature combustion gas coming from the combustor for driving a generator; a cooling system for cooling the combustor and blades of the turbine; and a waste heat recovery boiler having components of a feed water heater, an intermediate pressure economizer, a low pressure superheater, an intermediate pressure superheater, a high pressure superheater, a high pressure evaporator and a reheater and being fed with exhaust gas of the gas turbine so that condensed water coming from the condenser may be heated and vaporized via the components of the waste heat recovery boiler for supplying steam to the high pressure, intermediate pressure and low pressure turbines, respectively, characterized in that there is provided a fuel heater for heating the fuel before the fuel enters the combustor and saturated water coming from the intermediate pressure economizer of the waste heat recovery boiler is partially diverged to flow to the fuel heater for heating the fuel and the saturated water so used for heating the fuel is supplied to the condenser.

(3) A gas turbine combined cycle system as mentioned in (1) or (2) above, characterized in that the cooling system for cooling the combustor is fed with steam coming from the intermediate pressure superheater of the waste heat recovery boiler so as to cool a tail tube of the combustor and the steam heated by cooling the tail tube of the combustor is supplied to an inlet of the intermediate pressure turbine of the steam turbine.

(4) A gas turbine combined cycle system as mentioned in (1) or (2) above, characterized in that the cooling system for cooling the combustor is fed with steam coming from the intermediate pressure superheater of the waste heat recovery boiler so as to cool a tail tube of the combustor and the steam heated by cooling the tail tube of the combustor is supplied to an inlet side of the intermediate pressure turbine of the steam turbine and the cooling system for cooling the blades of the turbine is fed with steam coming from an outlet of the high pressure turbine of the steam turbine so as to cool the blades of the turbine and the steam heated by cooling stationary blades of the turbine is supplied to the inlet side of the intermediate pressure turbine of the steam turbine and the steam heated by cooling moving blades of the turbine is supplied to the reheater of the waste heat recovery boiler.

(5) A gas turbine combined cycle system as mentioned in (1) or (2) above, characterized in that the cooling system for cooling the combustor and the blades of the turbine is fed with steam coming from an outlet of the high pressure turbine of the steam turbine and the steam heated by cooling a tail tube of the combustor and the steam heated by cooling stationary blades of the turbine are supplied to an inlet side of the intermediate pressure turbine of the steam turbine and the steam heated by cooling moving blades of the turbine is supplied to the reheater of the waste heat recovery boiler and steam coming from the intermediate pressure superheater of the waste heat recovery boiler is mixed into an inlet of the cooling system for cooling the moving blades of the turbine.

(6) As gas turbine combined cycle system as mentioned in (1) or (2) above, characterized in that the cooling system for cooling the blades of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler.

(7) A gas turbine combined cycle system as mentioned in (3) above, characterized in that the cooling system for cooling the blades of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler and the air so cooled is supplied to the blades of the turbine.

(8) A gas turbine combined cycle system as mentioned in (4) above, characterized in that the cooling system for cooling the blades-of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler and the air so cooled is supplied to the blades of the turbine.

(9) A gas turbine combined cycle system as mentioned in (5) above, characterized in that the cooling system for cooling the blades of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler and the air so cooled is supplied to the blades of the turbine.

(10) A gas turbine combined cycle system as mentioned in (1) or (2) above, characterized in that there is provided an opening/closing valve in a system for leading the saturated water from the intermediate pressure economizer of the waste heat recovery boiler to the fuel heater and the cooling system for cooling the blades of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler.

(11) A gas turbine combined cycle system as mentioned in (3) above, characterized in that there is provided an opening/closing valve in a system for leading the saturated water from the intermediate pressure economizer of the waste heat recovery boiler to the fuel heater and the cooling system for cooling the blades of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler and the air so cooled is supplied to the blades of the turbine.

(12) A gas turbine combined cycle system as mentioned in (4) above, characterized in that there is provided an opening/closing valve in a system for leading the saturated water from the intermediate pressure economizer of the waste heat recovery boiler to the fuel heater and the cooling system for cooling the blades of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler and the air so cooled is supplied to the blades of the turbine.

(13) A gas turbine combined cycle system as mentioned in (5) above, characterized in that there is provided an opening/closing valve in a system for leading the saturated water from the intermediate pressure economizer of the waste heat recovery boiler to the fuel heater and the cooling system for cooling the blades of the turbine is supplied with a portion of water at an outlet of the feed water heater of the waste heat recovery boiler by a high pressure pump so that air of the cooling system may be cooled and the water heated by cooling the air is supplied into the high pressure evaporator of the waste heat recovery boiler and the air so cooled is supplied to the blades of the turbine.

According to the invention of (1) or (2) above, the saturated water heated at the intermediate pressure economizer is partially diverged to flow to the fuel heater for heat exchange with the fuel. Then, the saturated water is supplied to the inlet of the feed water heater in the invention (1) or to the condenser in the invention (2). The fuel is heated at the fuel heater and is supplied into the combustor. Thereby, the fuel flow rate becomes less and there is obtained an effect to enhance the combined efficiency.

According to the invention of (3) above, the tail tube of the combustor is cooled by the intermediate pressure superheater outlet steam and the heated steam is supplied to the inlet of the intermediate pressure turbine. Thereby, the combustion air used in the combustor increases in the quantity and the combustion temperature in the combustor is reduced as compared with the case of air cooling. Thus, generation of NOx is reduced. Also, like in the invention of (1) or (2) above, the fuel is heated at the fuel heater and thereby the fuel flow rate becomes less than in the conventional case and the gas turbine efficiency and the combined efficiency can be enhanced.

According to the invention of (4) above, the stationary blades and the moving blades of the turbine are cooled by steam supplied from the outlet of the high pressure turbine. The steam heated by cooling the stationary blades is supplied to the inlet of the intermediate pressure turbine and the steam heated by cooling the moving blades is supplied to the middle portion of the reheater. Thereby, the cooling air which has been used for cooling the stationary blades and the moving blades is largely reduced in the quantity so that the combustion air may be increased and there is obtained an effect to enhance both the gas turbine output and efficiency, resulting in the enhancement both of the combined output and efficiency. Also, like in the invention of (3) above, the tail tube of the combustor is cooled by steam supplied from the intermediate pressure superheater and the steam heated by cooling the tail tube is supplied to the inlet of the intermediate pressure turbine and thereby the combustion temperature is reduced and generation of NOx is also reduced. Further, as the fuel is heated at the fuel heater, the fuel flow rate can be made less than in the conventional case.

According to the invention of (5) above, the tail tube of the combustor is cooled by a portion of the high pressure turbine outlet steam, not by the intermediate pressure superheater outlet steam, and the intermediate pressure superheater outlet steam is mixed into the inlet of the moving blade cooling steam so that the moving blade cooling steam supply temperature may be reduced. As the intermediate pressure superheater outlet temperature is lower than the high pressure turbine outlet temperature, the moving blade cooling steam supply temperature is reduced and cooling of the moving blades, which constitute an important rotational portion, can be strengthened. Also, like in the invention of (1) or (2) above, the fuel is heated at the fuel heater and thereby the fuel flow rate becomes less than in the conventional case and the gas turbine efficiency and the combined efficiency can be enhanced.

According to the invention of (6) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased in the quantity. Thus, the steam turbine output is increased and the combined efficiency and the combined output are enhanced. Also, like in the invention of (1) or (2) above, the fuel is heated at the fuel heater and thereby the fuel flow rate becomes less than in the conventional case and the gas turbine efficiency and the combined efficiency can be enhanced.

According to the invention of (7) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased and the quantity. Thus, the steam turbine output is increased and the combined efficiency and the combined output are enhanced. Also, like in the invention of (3) above, the fuel is heated at the fuel heater and thereby the fuel flow rate becomes less than in the conventional case. Further, the tail tube of the combustor is cooled by the intermediate pressure superheater outlet steam and -the heated steam is supplied to the inlet of the intermediate pressure turbine. Thereby, the combustion air used in the combustor increases in the quantity and the combustion temperature in the combustor is reduced as compared with the case of air cooling. Thus, generation of NOx is reduced.

According to the invention of (8) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased in the quantity. Thus, the steam turbine output is increased and the combined efficiency and the combined output are enhanced. Also, like in the invention of (4) above, the fuel is heated at the fuel heater and thereby the fuel flow rate becomes less than in the conventional case. Further, the tail tube of the combustor is cooled by the intermediate pressure superheater outlet steam and the heated steam is supplied to the inlet of the intermediate pressure turbine. Thereby, the combustion air used in the combustor increases in the quantity and the combustion temperature in the combustor is reduced as compared with the case of air cooling. Thus, generation of NOx is reduced. Further, like in the invention of (4) above, the stationary blades and the moving blades of the turbine are cooled by steam supplied from the outlet of the high pressure turbine. The steam heated by cooling the stationary blades is supplied to the inlet of the intermediate pressure turbine and the steam heated by cooling the moving blades is supplied to the middle portion of the reheater. Thereby, the cooling air which has been used for cooling the stationary blades and the moving blades is largely reduced in the quantity so that the combustion air may be increased and there is obtained an effect to enhance both the gas turbine output and efficiency, resulting in the enhancement both of the combined output and efficiency.

According to the invention of (9) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased in the quantity. Thus, the steam turbine output is increased and the combined efficiency and the combined output are enhanced. Also, like in the invention of (5) above, the fuel is heated at the fuel heater and thereby the fuel flow rate becomes less than in the conventional case and the gas turbine efficiency and the combined efficiency are enhanced. Further, the stationary blades and the moving blades-of the turbine are cooled by steam supplied from the outlet of the high pressure turbine. The steam heated by cooling the stationary blades is supplied to the inlet of the intermediate pressure turbine and the steam heated by cooling the moving blades is supplied to the middle portion of the reheater. Thereby, the cooling air which has been used for cooling the stationary blades and the moving blades is largely reduced in the quantity so that the combustion air may be increased and there is obtained an effect to enhance both the gas turbine output and efficiency, resulting in the enhancement both of the combined output and efficiency. Also, like in the invention of (5) above, the tail tube of the combustor is cooled by a portion of the high pressure turbine outlet steam, not by the intermediate pressure superheater outlet steam, and the intermediate pressure superheater outlet steam is mixed into the inlet of the moving blade cooling steam so that the moving blade cooling steam supply temperature may be reduced. As the intermediate pressure superheater outlet temperature is lower than the high pressure turbine outlet temperature, the moving blade cooling steam supply temperature is reduced and cooling of the moving blades, which constitute an important rotational portion, can be strengthened.

According to the invention of (10) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased in the quantity. Thus, the steam turbine output is increased and the combined efficiency and the combined output are enhanced. If the fuel is of a high temperature without being preheated or if heating of the fuel is dangerous because of characteristics of the fuel, then the opening/closing valve is closed so that the construction may be made as if no fuel heater for preheating the fuel is provided.

According to the invention of (11) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased in the quantity. Thus, the steam turbine output is increased and the combined efficiency and the combined output are enhanced. If the fuel is of a high temperature without being preheated or if heating of the fuel is dangerous because of characteristics of the fuel, then the opening/closing valve is closed so that the construction may be made as if no fuel heater for preheating the fuel is provided. Also, like in the invention of (3) above, the tail tube of the combustor is cooled by the intermediate pressure superheater outlet steam and the heated steam is supplied to the inlet of the intermediate pressure turbine. Thereby, the combustion air used in the combustor increases in the quantity and the combustion temperature in the combustor is reduced as compared with the case of air cooling. Thus, generation of NOx is reduced.

According to the invention of (12) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased in the quantity. Thus, the steam turbine output is increased and the combined efficiency and the combined output are enhanced. Also, like in the invention of (4) above, the tail tube of the combustor is cooled by the intermediate pressure superheater outlet steam and the heated steam is supplied to the inlet of the intermediate pressure-turbine. Thereby, the combustion air used in the combustor increases in the quantity and the combustion temperature in the combustor is reduced as compared with the case of air cooling. Thus, generation of NOx is reduced. Further, the stationary blades and the moving blades of the turbine are cooled by steam supplied from the outlet of the high pressure turbine. The steam heated by cooling the stationary blades is supplied to the inlet of the intermediate pressure turbine and the steam heated by cooling the moving blades is supplied to the middle portion of the reheater. Thereby, the cooling air which has been used for cooling the stationary blades and the moving blades is largely reduced in the quantity so that the combustion air may be increased and there is obtained an effect to enhance both the gas turbine output and efficiency resulting in the enhancement both of the combined output and efficiency. If the fuel is of a high temperature without being preheated or if heating of the fuel is dangerous because of characteristics of the fuel, then the opening/closing valve is closed so that the construction may be made as if no fuel heater for preheating the fuel is provided.

According to the invention of (13) above, the high pressure pump outlet water is partially diverged to be heat-exchanged with the blade cooling air of the cooling system for cooling the blade cooling air. The water so heat-exchanged is heated and supplied into the high pressure evaporator. Thereby, while the waste heat of the cooling system for cooling the blade cooling air has been discharged outside in vain because of cooling by the cooling fan, this waste heat is made use of so that the high pressure generated steam of the waste heat recovery boiler may be increased in the quantity. Thus, the steam turbine output is increased and the combined efficiency and the combined output are enhanced. Also, like in the invention of (5) above, the stationary blades and the moving blades of the turbine are cooled by steam supplied from the outlet of the high pressure turbine. The steam heated by cooling the stationary blades is supplied to the inlet of the intermediate pressure turbine and the steam heated by cooling the moving blades is supplied to the middle portion of the reheater. Thereby, the cooling air which has been used for cooling the stationary blades and the moving blades is largely reduced in the quantity so that the combustion air may be increased and there is obtained an effect to enhance both the gas turbine output and efficiency, resulting in the enhancement both of the combined output and efficiency. Further, like in the invention of (5) above, the tail tube of the combustor is cooled by a portion of the high pressure turbine outlet steam, not by the intermediate pressure superheater outlet steam, and the intermediate pressure superheater outlet steam is mixed into the inlet of the moving blade cooling steam so that the moving blade cooling steam supply temperature may be reduced. As the intermediate pressure superheater outlet temperature is lower than the high pressure turbine outlet temperature, the moving blade cooling steam supply temperature is reduced and cooling of the moving blades, which constitute an important rotational portion, can be strengthened. If the fuel is of a high temperature without being preheated or if heating of the fuel is dangerous because of characteristics of the fuel, then the opening/closing valve is closed so that the construction may be made as if no fuel heater for preheating the fuel is provided.

DESCRIPTION OF THE PREFERRED EMBODIMENTS

Herebelow, embodiments according to the present invention will be described concretely with reference to figures.

Figure 1:
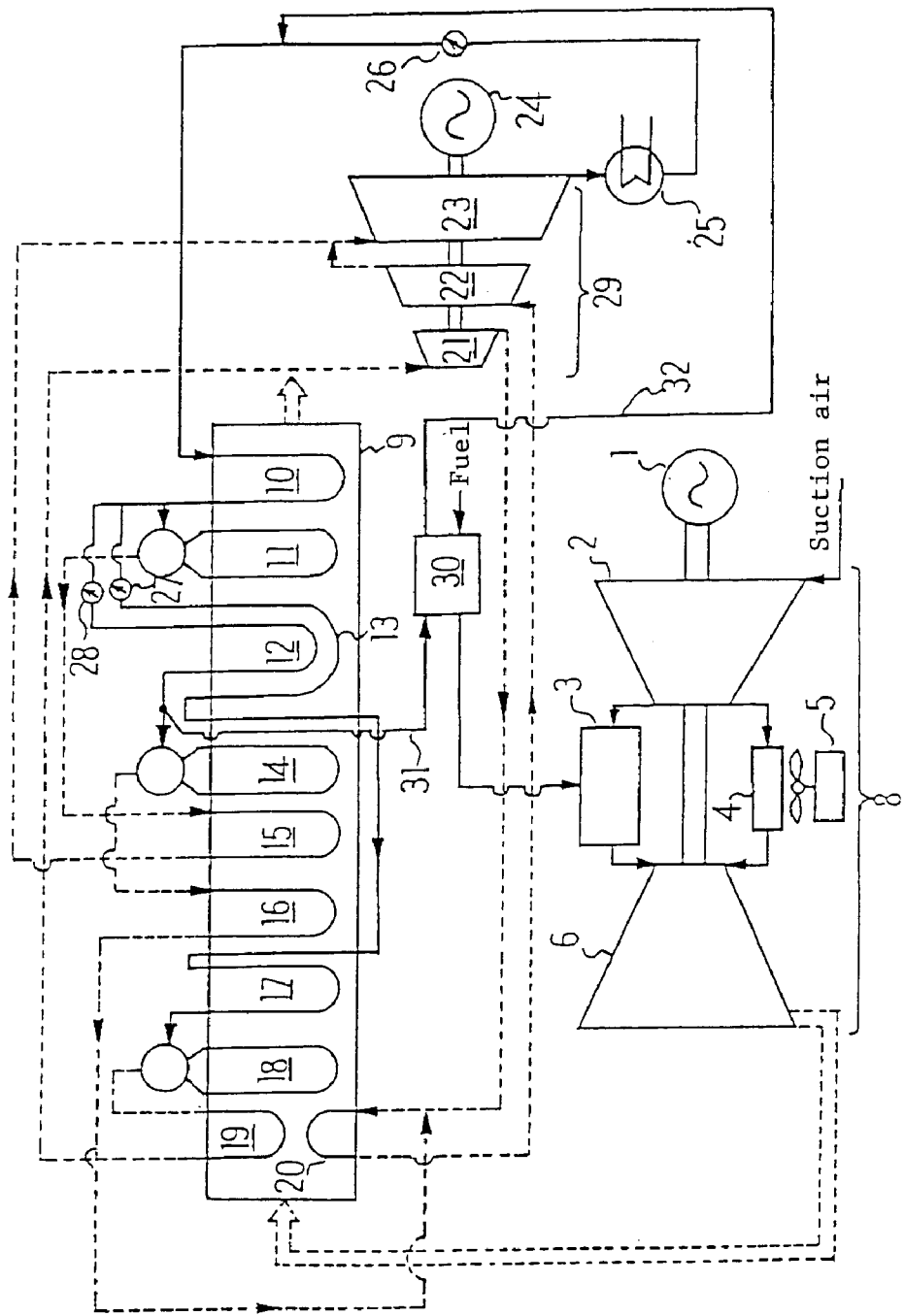
FIG. 1 is a system diagram of a gas turbine combined cycle system of a first embodiment according to the present invention.

FIG. 1 is a system diagram of a gas turbine combined cycle system of a first embodiment according to the present invention. In FIG. 1, the present first embodiment is featured in the portion shown by numerals 30, 31, 32 and construction of the other portion is same as that in the prior art shown in FIG. 14. Hence, description of the portion which is common to the prior art case and is applicable hereto as it is will be omitted and the featured portion of the present invention will be described below.

In FIG. 1, saturated water of about 250° C. at an outlet of the intermediate pressure economizer 12 is partially diverged into a fuel heater 30 via a piping 31 for heating the fuel. The fuel is heated to about 210° C. by the saturated water and is supplied into the combustor 3 of the turbine. The saturated water used for heating the fuel and cooled to about 100° C. at the fuel heater 30 is led into an inlet of the feed water heater 10 via a piping 32. It is to be noted that the piping 32 may be connected to the condenser 25, as described later with respect to FIG. 13, instead of being connected to the inlet of the feed water heater 10.

In the mentioned first embodiment, the fuel is preheated to be temperature-elevated by steam at the fuel heater 30 and is supplied into the combustor 3 and thereby the necessary fuel flow rate becomes less and the gas turbine efficiency and the combined efficiency are enhanced.

Figure 2:
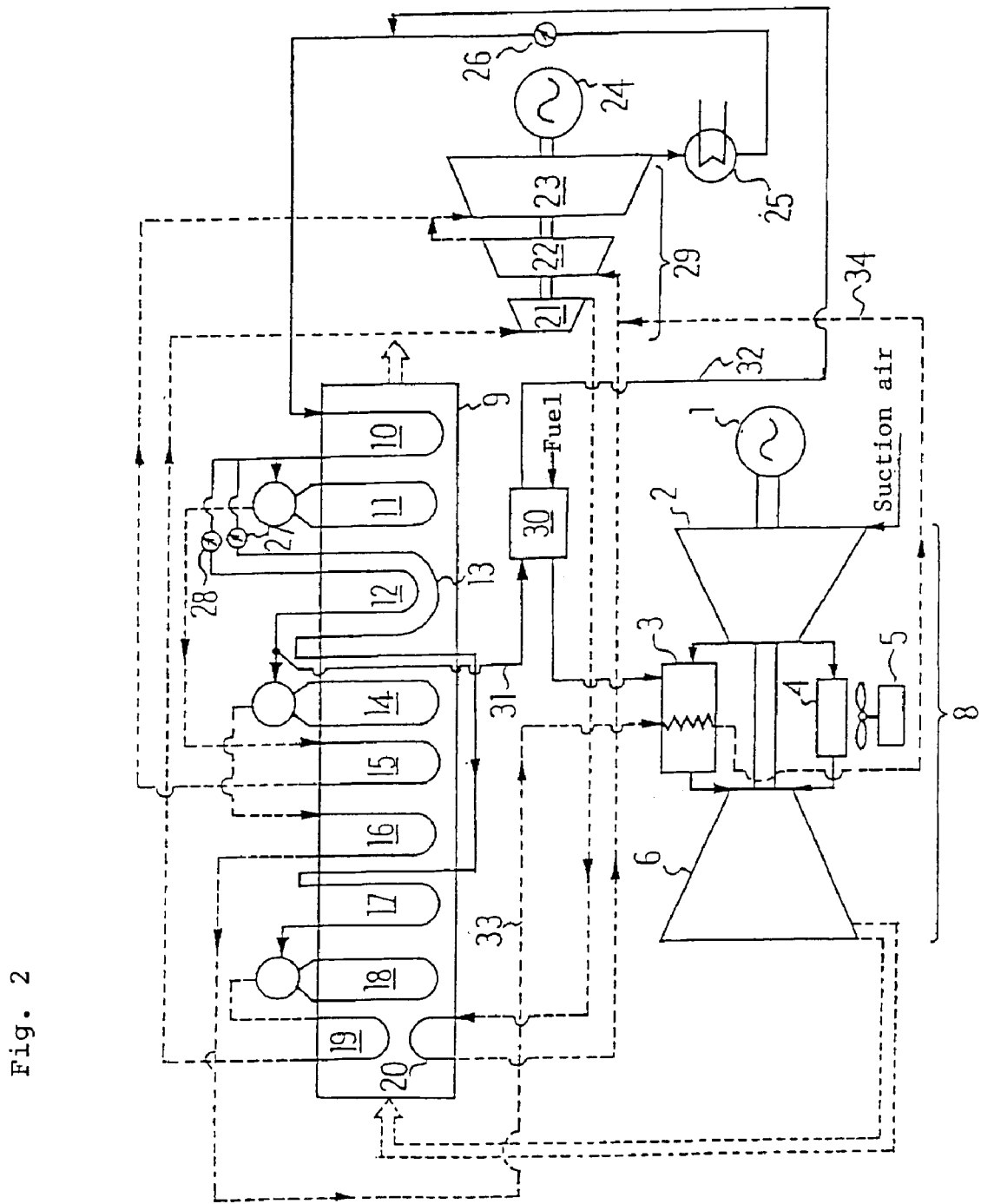
FIG. 2 is a system diagram of a gas turbine combined cycle system of a second embodiment according to the present invention.

FIG. 2 is a system diagram of a gas turbine combined cycle system of a second embodiment according to the present invention. In FIG. 2, the present second embodiment is featured in the portion shown by numerals 33, 34 which are pipings of a steam cooling system for cooling a tail tube of the combustor 3 and construction of the other portion is same as that in the first embodiment shown in FIG. 1. The feature of the pipings 33, 34 will be described below.

While, in the first embodiment shown in FIG. 1, the tail tube of the combustor 3 is cooled by outlet air of the compressor 2, although not illustrated, in the present second embodiment shown in FIG. 2, steam of about 250° C. at an outlet of the intermediate pressure superheater 16 is led into the tail tube of the combustor 3 for cooling thereof via the piping 33 and the steam used for the cooling and heated to about 580 to 590° C. is supplied to an inlet of the intermediate pressure turbine 22 via the piping 34.

In the present second embodiment, like in the first embodiment shown in FIG. 1, the fuel is heated at the fuel heater 30 and thereby the fuel flow rate becomes less as compared with the prior art case and the gas turbine efficiency and the combined efficiency are enhanced and, in addition to this effect, the tail tube of the combustor 3 is cooled by the steam so that combustion air quantity to be used in the combustor 3 may be increased and thereby combustion temperature in the combustor 3 becomes lower as compared with the case where the combustor tail tube is cooled by air and occurrence of NOx can be reduced.

Figure 3:
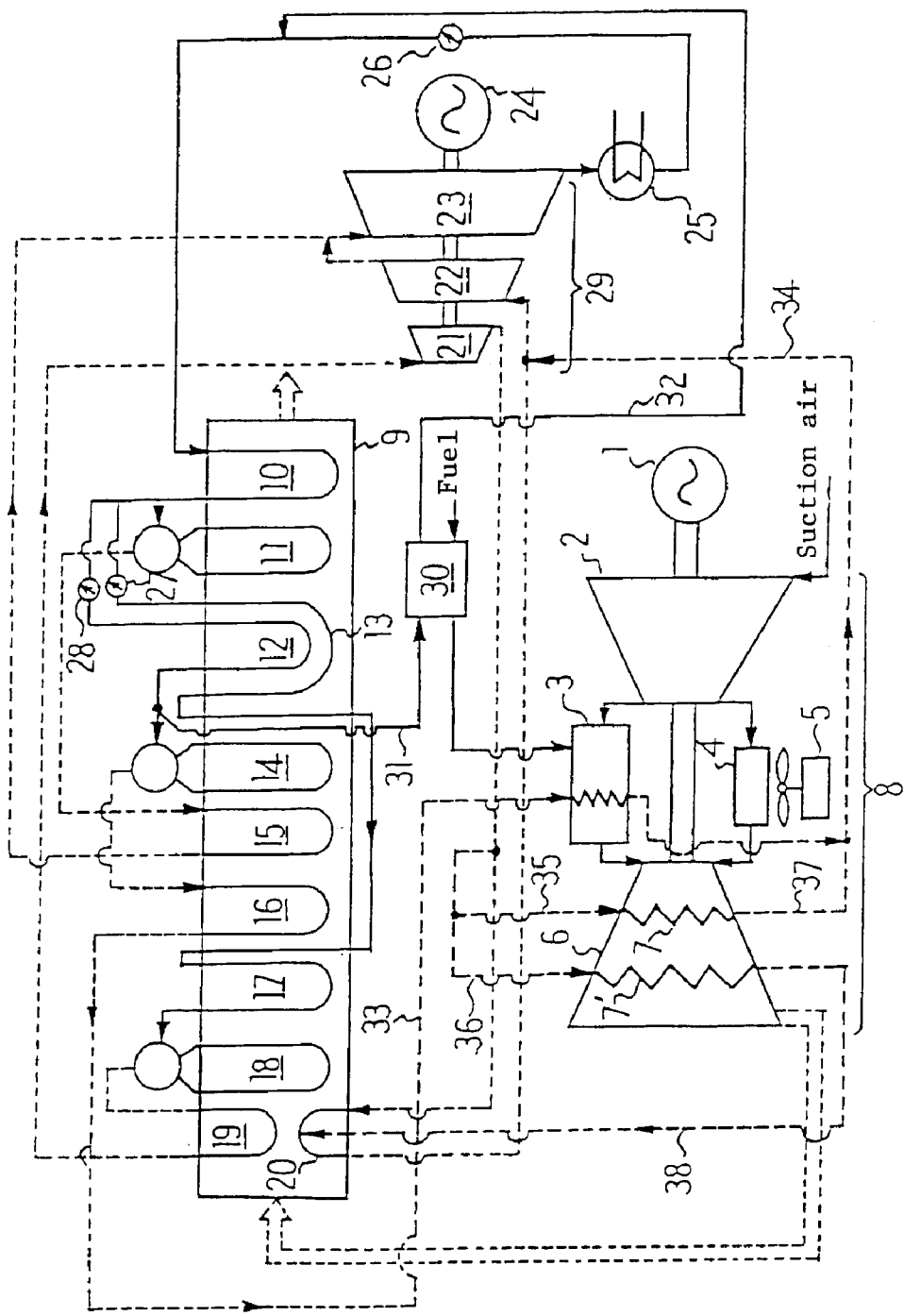
FIG. 3 is a system diagram of a gas turbine combined cycle system of a third embodiment according to the present invention.

FIG. 3 is a system diagram of a gas turbine combined cycle system of a third embodiment according to the present invention. In FIG. 3, the present third embodiment is featured in the portion shown by numerals 35, 36, 37, 38 which are pipings of a steam cooling system for cooling a stationary blade 7 and a moving blade 7' of the turbine 6 and construction of the other portion is same as that in the second embodiment shown in FIG. 2. The feature of the pipings 35, 36, 37, 38 will be described below.

In FIG. 3, steam of about 360° C. coming from an outlet of the high pressure turbine 21 is taken partially via the pipings 35, 36 to be supplied into the turbine 6 for cooling the turbine stationary blade 7 and moving blade 7'. The steam used for cooling the stationary blade 7 and heated to about 580° C. is supplied to an inlet of the intermediate pressure turbine 22 via the piping 37. The steam used for cooling the moving blade 7' and heated to about 380° C. is supplied to a middle portion of the reheater 20 via the piping 38.

By the mentioned construction, cooling air which has been used for cooling the turbine stationary blade 7 and moving blade 7' is reduced largely in the quantity so that combustion air may be increased and both of output and efficiency of the gas turbine are enhanced and this results in the enhancement both of the combined output and efficiency. It is to be noted that because a portion of the stationary blade 7 of a rear stage is still to be cooled by air and detailed portions of the moving blade 7' are also to be cooled by air and the air used therefor as well as sealing air for the blades are taken from the cooling air coming from the blade cooling air cooler 4, the blade cooling air cannot be eliminated completely.

Figure 4:
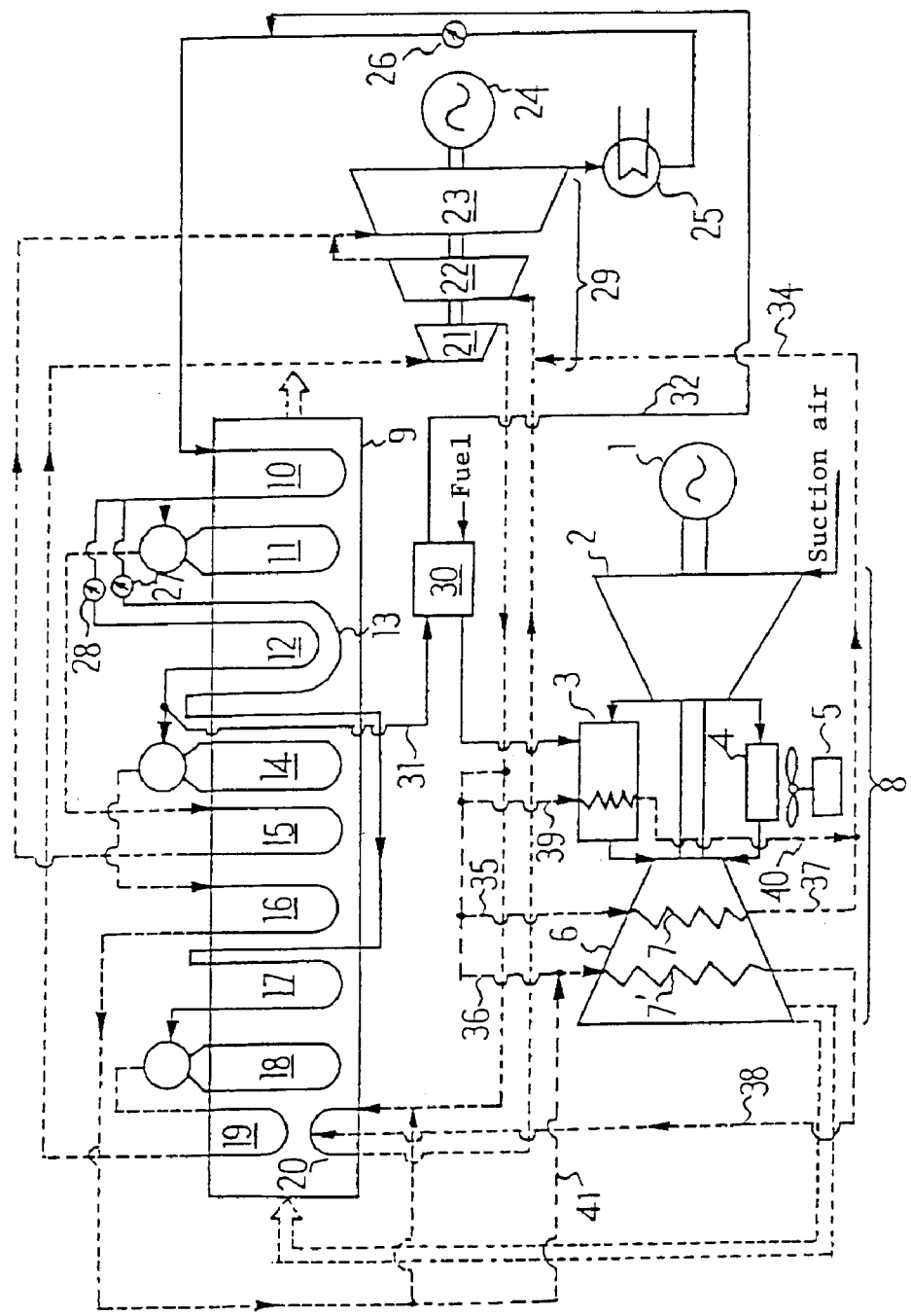
FIG. 4 is a system diagram of a gas turbine combined cycle system of a fourth embodiment according to the present invention.

FIG. 4 is a system diagram of a gas turbine combined cycle system of a fourth embodiment according to the present invention. In FIG. 4, as compared with the third embodiment shown in FIG. 3, the present fourth embodiment is featured in numerals 39, 40 which are pipings of a steam cooling system for the combustor tail tube and in numeral 41 which is a piping of a steam cooling system for the turbine moving blade, wherein the steam cooling system of the combustor tail tube of the third embodiment shown in FIG. 3 is changed and further a steam supply system for supplying steam to the moving blade 7' via the piping 41 is added.

While, in the third embodiment shown in FIG. 3, the tail tube of the combustor 3 is cooled by outlet steam of the intermediate pressure superheater 16, in the present fourth embodiment shown in FIG. 4, the tail tube is cooled by steam taken partially via the piping 39 from outlet steam of the high pressure turbine 21 and the steam used for the cooling and heated to about 580° C. flows through the piping 40 to join in the piping 34 which connects to the inlet of the intermediate pressure turbine 22. Also, outlet steam of about 250° C. of the intermediate pressure superheater 16 flows through the piping 41 to be mixed into a turbine inlet of the cooling steam of the moving blade 7' so that supply temperature of the moving blade cooling steam may be reduced.

Figure 5:
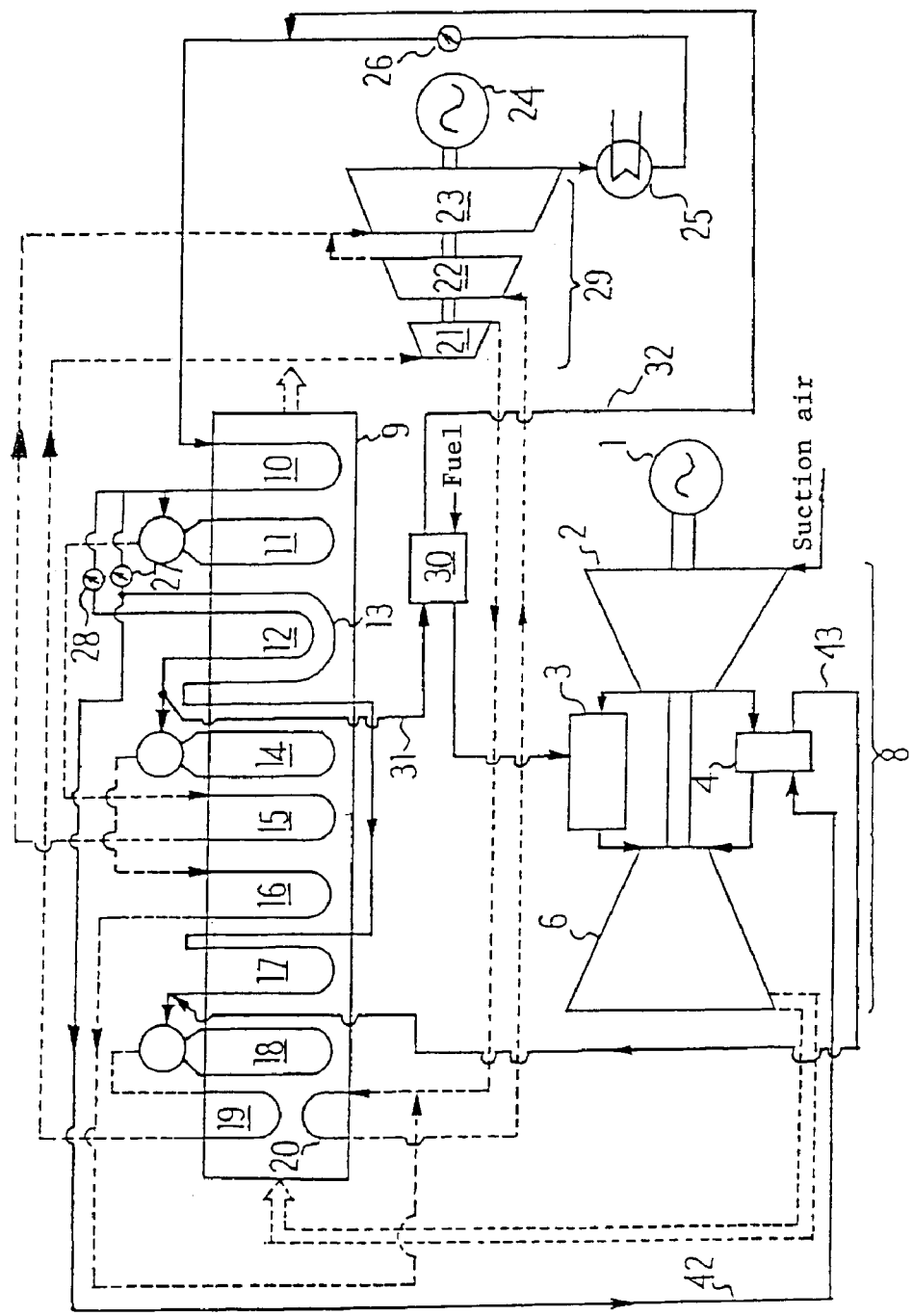
FIG. 5 is a system diagram of a gas turbine combined cycle system of a fifth embodiment according to the present invention.

FIG. 5 is a system diagram of a gas turbine combined cycle system of a fifth embodiment according to the present invention. In FIG. 5, the present fifth embodiment is featured in the portion shown by numerals 42, 43 which are pipings of a cooling system of the blade cooling air cooler 4 to substitute for the air cooling system of the blade cooling air cooler 4 of the first embodiment shown in FIG. 1 and construction of the other portion is same as that in the first embodiment shown in FIG. 1. The feature of the pipings 42, 43 will be described below.

Figure 14:
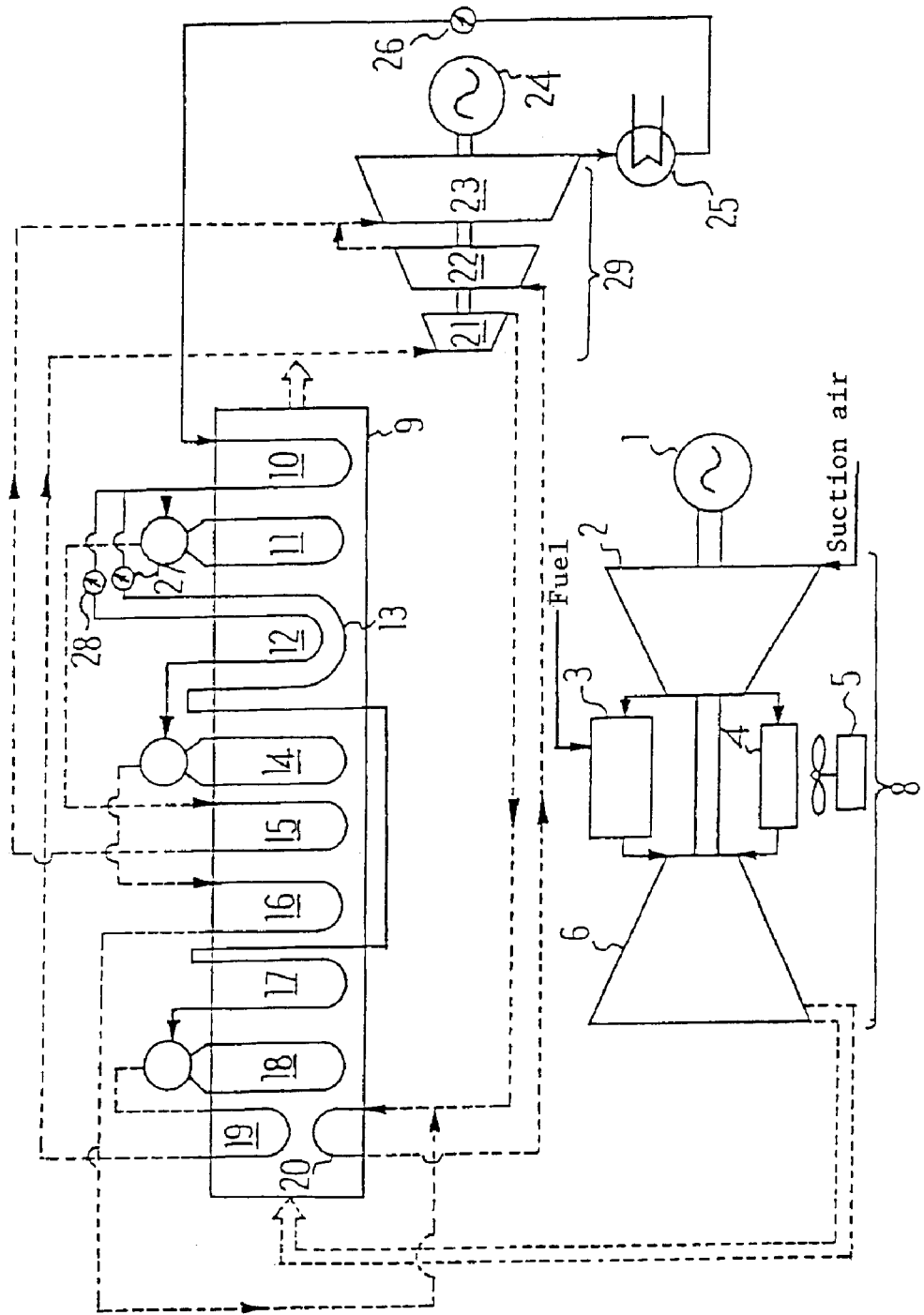
FIG. 14 is a system diagram of a gas turbine combined cycle system in the prior art.

While, in the first embodiment shown in FIG. 1, like in the prior art case shown in FIG. 14, the blade cooling air cooler 4 is cooled by the cooling fan 5, in the present fifth embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. Thus, the air of about 490° C. coming from the compressor 2 is cooled to about 200° C. at the blade cooling air cooler 4 and is supplied into the blades of the turbine 6. While, in the hereafter applied cooling system to drive the cooling fan 5, heat of the blade cooling air cooler 4 has been wasted outside, in the present fifth embodiment, the high pressure steam generated at the waste heat recovery boiler 9 is increased in the quantity and thereby the steam turbine output is increased and both of the combined efficiency and the combined output can be increased.

Figure 6:
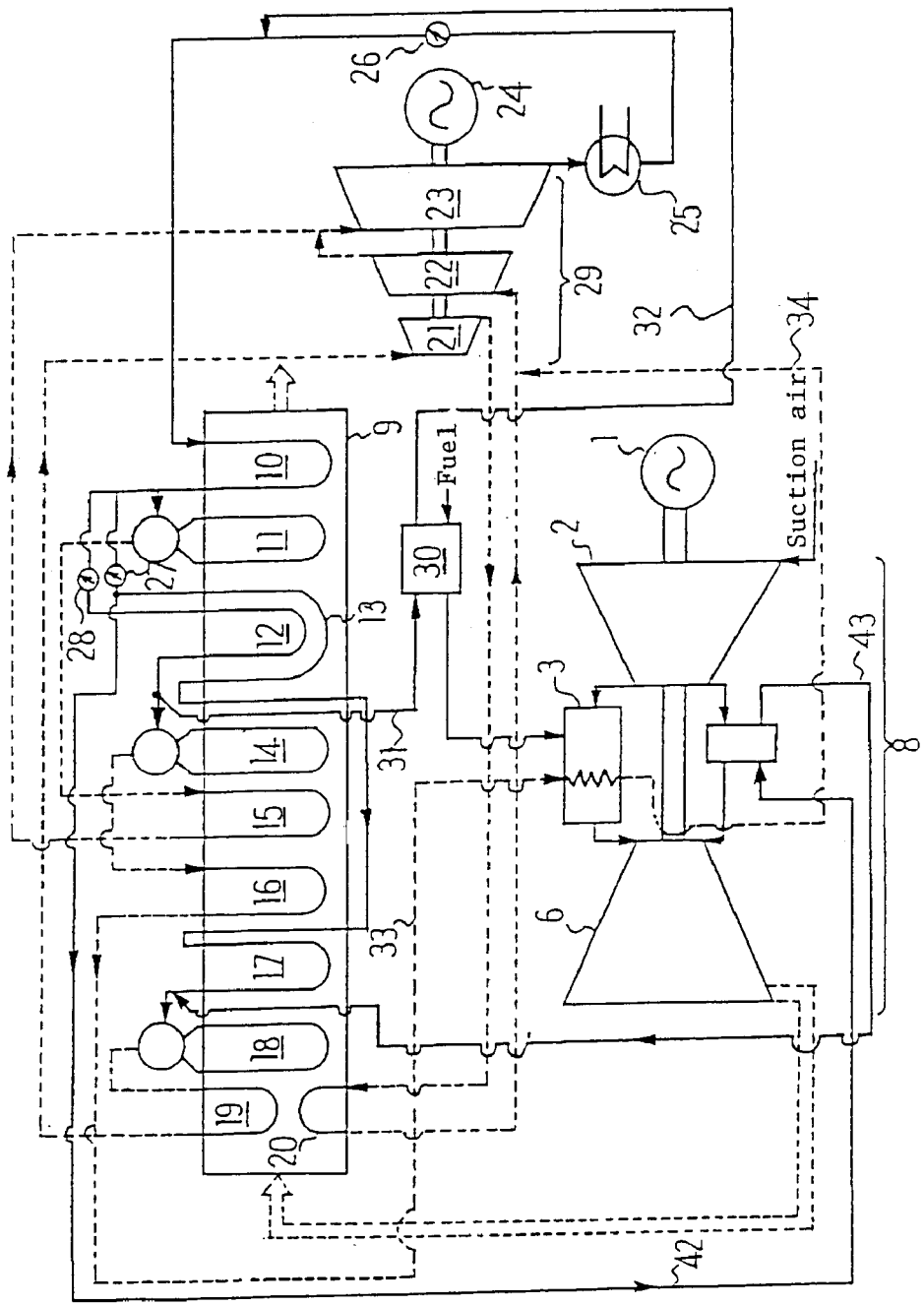
FIG. 6 is a system diagram of a gas turbine combined cycle system of a sixth embodiment according to the present invention.

FIG. 6 is a system diagram of a gas turbine combined cycle system of a sixth embodiment according to the present invention. In FIG. 6, the present sixth-embodiment is featured in the portion shown by numerals 42, 43 which are pipings of a cooling system of the blade cooling air cooler 4 to substitute for the air cooling system of the blade cooling air cooler 4 of the second embodiment shown in FIG. 2 and construction of the other portion is same as that in the second embodiment shown in FIG. 2. The feature of the pipings 42, 43 will be described below.

While, in the second embodiment shown in FIG. 2, the blade cooling air cooler 4 is cooled by the cooling fan 5, in the present sixth embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. While, in the heretofore applied cooling system to drive the cooling fan 5, heat of the blade cooling air cooler 4 has been wasted outside, in the present sixth embodiment employing the mentioned construction, the high pressure steam generated at the waste heat recovery boiler 9 is increased in the quantity and thereby the steam turbine output is increased and both of the combined efficiency and the combined output can be increased.

Figure 7:
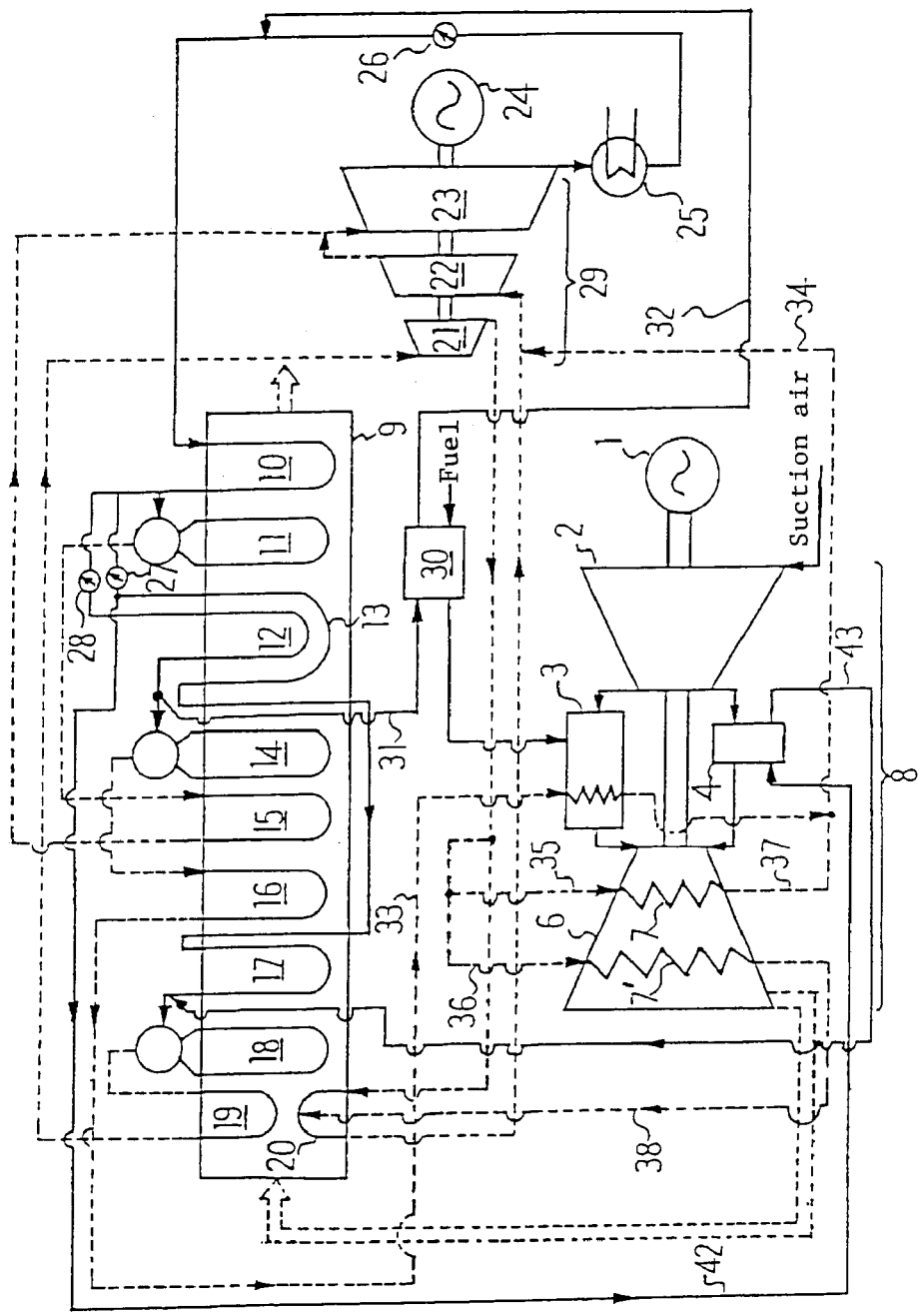
FIG. 7 is a system diagram of a gas turbine combined cycle system of a seventh embodiment according to the present invention.

FIG. 7 is a system diagram of a gas turbine combined cycle system of a seventh embodiment according to the present invention. In FIG. 7, the present seventh embodiment is featured in the portion shown by numerals 42, 43 which are pipings of a cooling system of the blade cooling air cooler 4 to substitute for the air cooling system of the blade cooling air cooler 4 of the third embodiment shown in FIG. 3 and construction of the other portion is same as that in the third embodiment shown in FIG. 3. The feature of the pipings 42, 43 will be described below.

While, in the third embodiment shown in FIG. 3, the blade cooling air cooler 4 is cooled by the cooling fan 5, in the present seventh embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. While, in the heretofore applied cooling system to drive the cooling fan 5, heat of the blade cooling air cooler 4 has been wasted outside, in the present seventh embodiment employing the mentioned construction, the high pressure steam generated at the waste heat recovery boiler 9 is increased in the quantity and thereby the steam turbine output is increased and both of the combined efficiency and the combined output can be increased.

Figure 8:
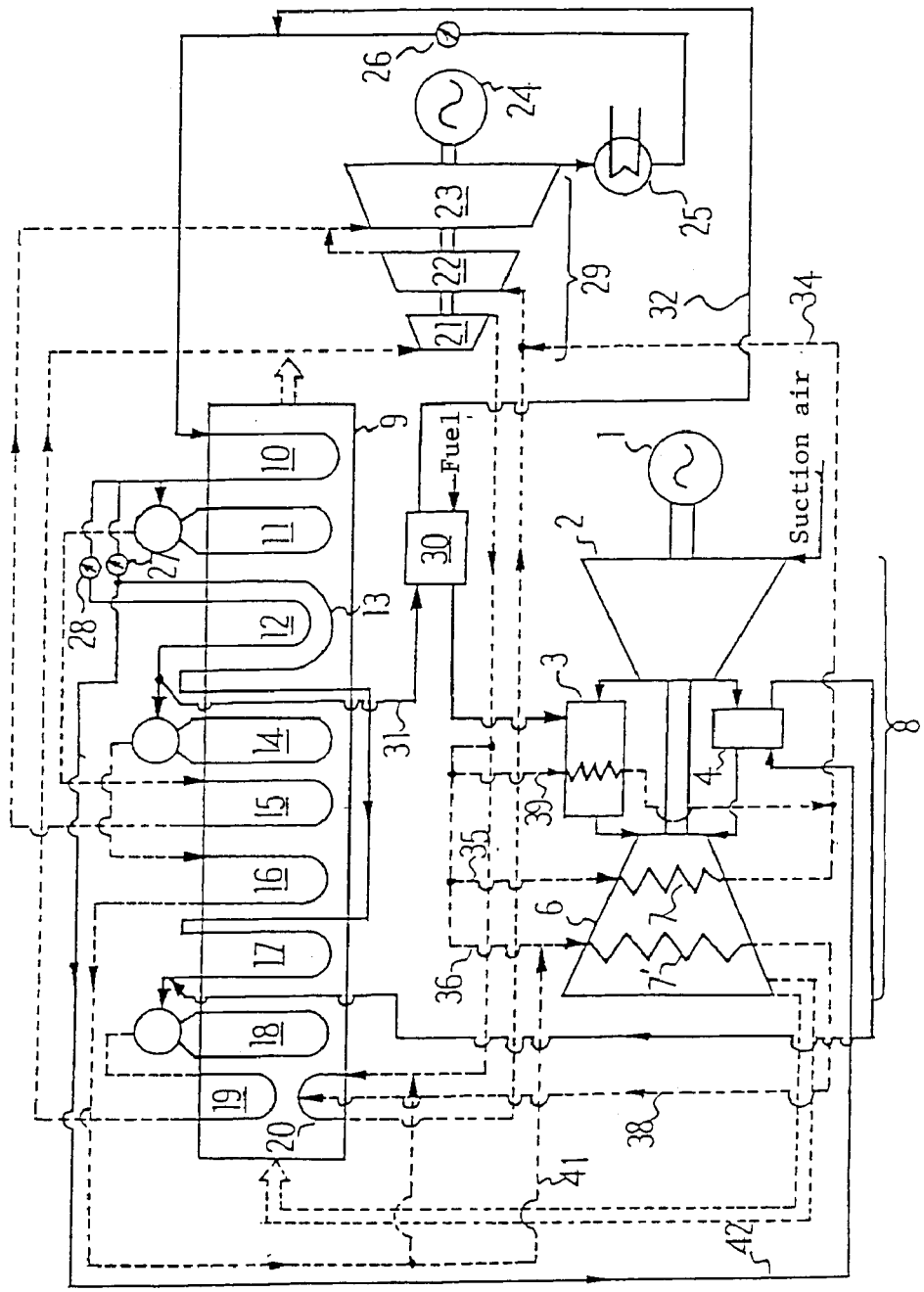
FIG. 8 is a system diagram of a gas turbine combined cycle system of an eighth embodiment according to the present invention.

FIG. 8 is a system diagram of a gas turbine combined cycle system of an eighth embodiment according to the present invention. In FIG. 8, the present eighth embodiment is featured in the portion shown by numerals 42, 43 which are pipings of a cooling system of the blade cooling air cooler 4 to substitute for the air cooling system of the blade cooling air cooler 4 of the fourth embodiment shown in FIG. 4 and construction of the other portion is same as that in the fourth embodiment shown in FIG. 4. The feature of the pipings 42, 43 will be described below.

While, in the fourth embodiment shown in FIG. 4, the blade cooling air cooler 4 is cooled by the cooling fan 5, in the present eighth embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. While, in the heretofore applied cooling system to drive the cooling fan 5, heat of the blade cooling air cooler 4 has been wasted outside, in the present eighth embodiment employing the mentioned construction, the high pressure steam generated at the waste heat recovery boiler 9 is increased in the quantity and thereby the steam turbine output is increased and both of the combined efficiency and the combined output can be increased.

Figure 9:
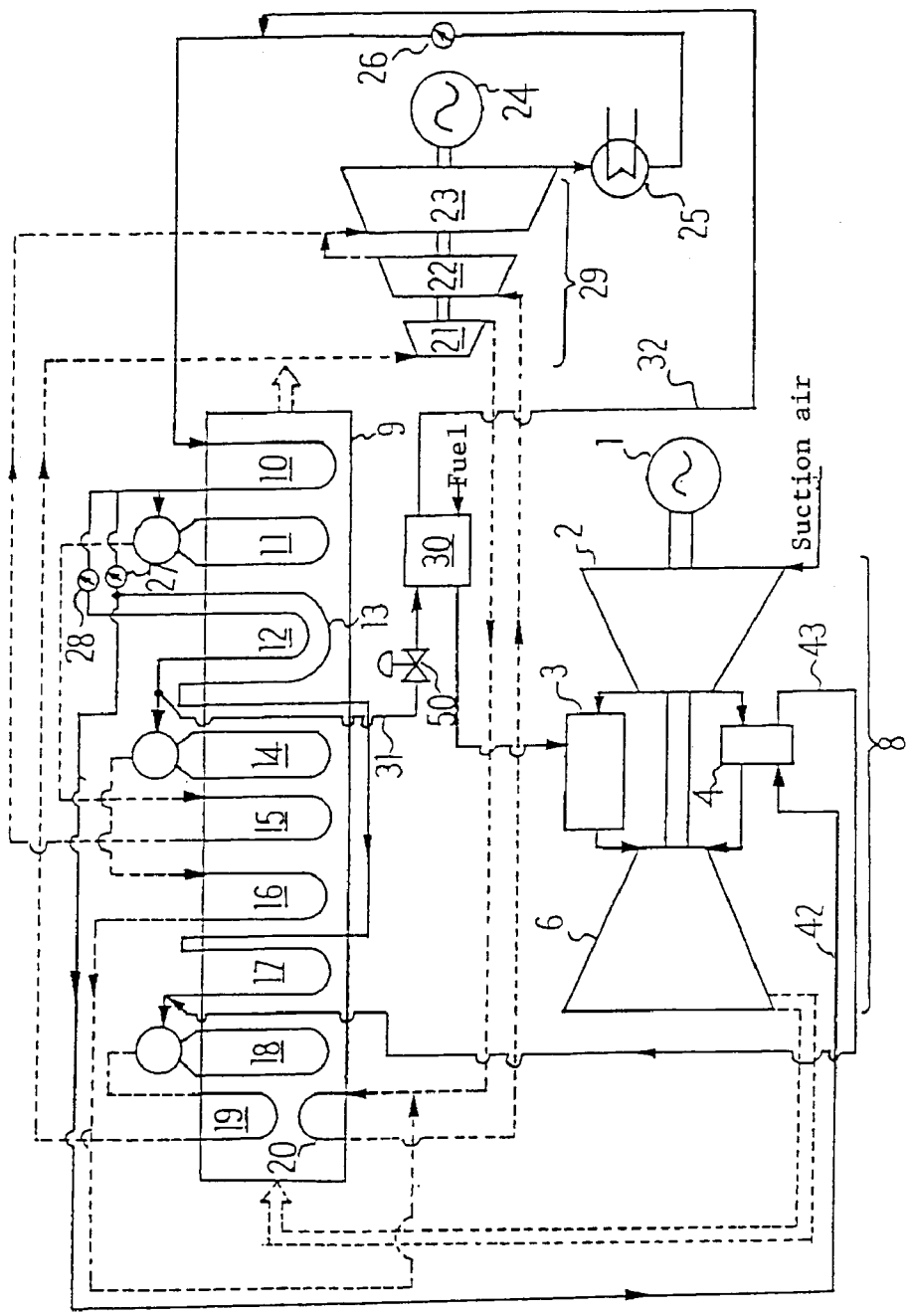
FIG. 9 is a system diagram of a gas turbine combined cycle system of a ninth embodiment according to the present invention.

FIG. 9 is a system diagram of a gas turbine combined cycle system of a ninth embodiment according to the present invention. In FIG. 9, the present ninth embodiment is featured in the portion shown by numerals 42, 43 which are pipings of a cooling system of the blade cooling air cooler 4 to substitute for the air cooling system of the blade cooling air cooler 4 of the first embodiment shown in FIG. 1 as well as featured in the portion shown by numeral 50 which is an opening/closing valve provided in a fuel heating system and construction of the other portion is same as that in the first embodiment shown in FIG. 1. The feature of the pipings 42, 43 and the opening/closing valve 50 will be described below.

While, in the first embodiment shown in FIG. 1, the blade cooling air cooler 4 is cooled by the cooling fan 5, in the present ninth embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. While, in the heretofore applied cooling system to drive the cooling fan 5, heat of the blade cooling air cooler 4 has been wasted outside, in the present ninth embodiment employing the mentioned construction, the high pressure steam generated at the waste heat recovery boiler 9 is increased in the quantity and thereby the steam turbine output is increased and both of the combined efficiency and the combined output can be increased. If the fuel is of a high temperature without being preheated or if heating of the fuel is dangerous because of characteristics of the fuel, then the opening/closing valve 50 is closed so that the construction may be made as if no fuel heater 30 is provided.

Figure 10:
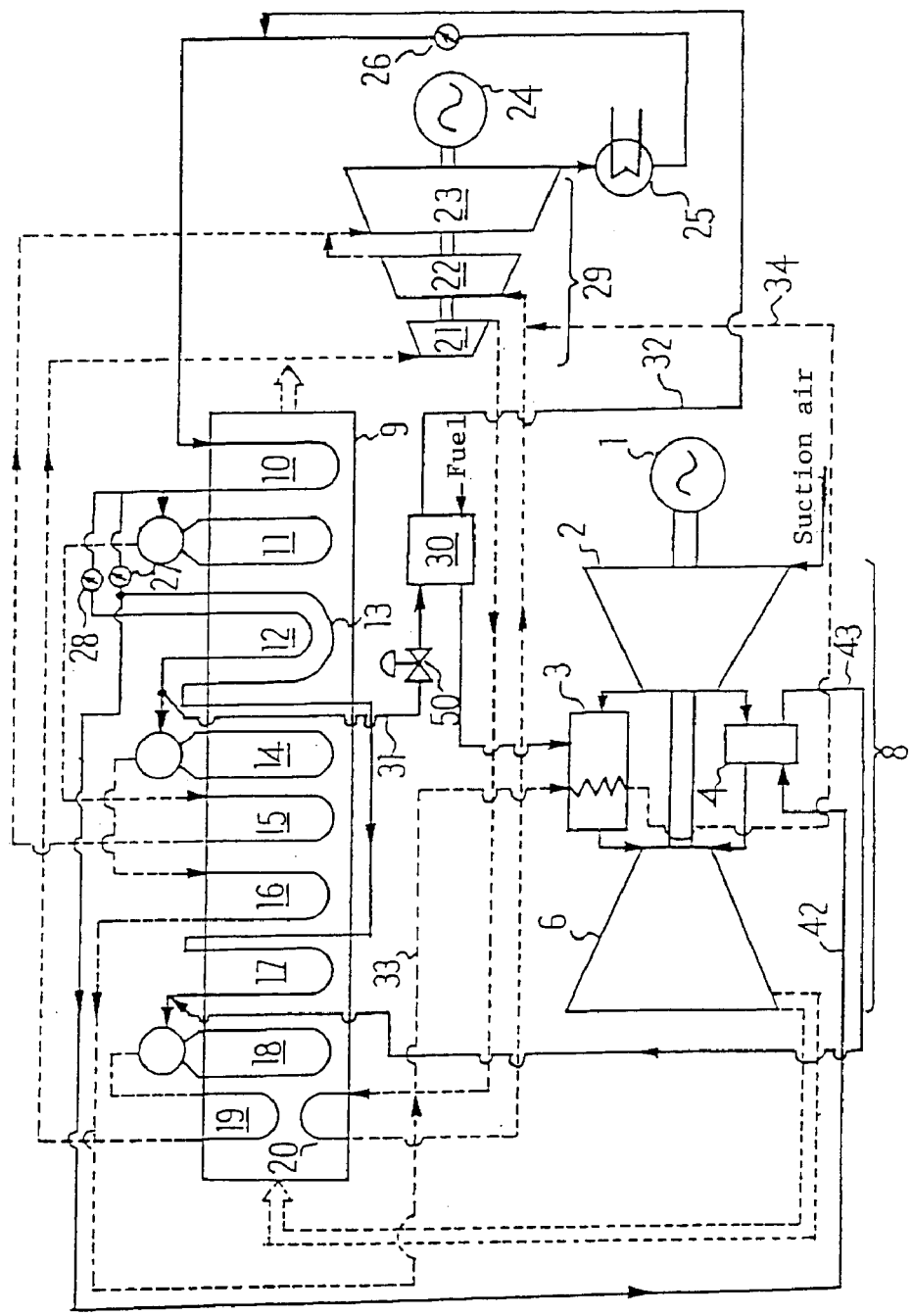
FIG. 10 is a system diagram of a gas turbine combined cycle system of a tenth embodiment according to the present invention.

FIG. 10 is a system diagram of a gas turbine combined cycle system of a tenth embodiment according to the present invention. In FIG. 10, the present tenth embodiment is featured in the portion shown by numerals 42, 43 which are pipings of a cooling system of the blade cooling air cooler 4 to substitute for the air cooling system of the blade cooling air cooler 4 of the second embodiment shown in FIG. 2 as well as featured in the portion shown by numeral 50 which is an opening/closing valve provided in a fuel heating system and construction of the other portion is same as that in the second embodiment shown in FIG. 2. The feature of the pipings 42, 43 and the opening/closing valve 50 will be described below.

While, in the second embodiment shown in FIG. 2, the blade cooling air cooler 4 is cooled by the cooling fan 5, in the present tenth embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. While, in the heretofore applied cooling system to drive the cooling fan 5, heat of the blade cooling air cooler 4 has been wasted outside, in the present tenth embodiment employing the mentioned construction, the high pressure steam generated at the waste heat recovery boiler 9 is increased in the quantity and thereby the steam turbine output is increased and both of the combined efficiency and the combined output can be increased. If the fuel is of a high temperature without being preheated or if heating of the fuel is dangerous because of characteristics of the fuel, then the opening/closing valve 50 is closed so that the construction may be made as if no fuel heater 30 is provided.

Figure 11:
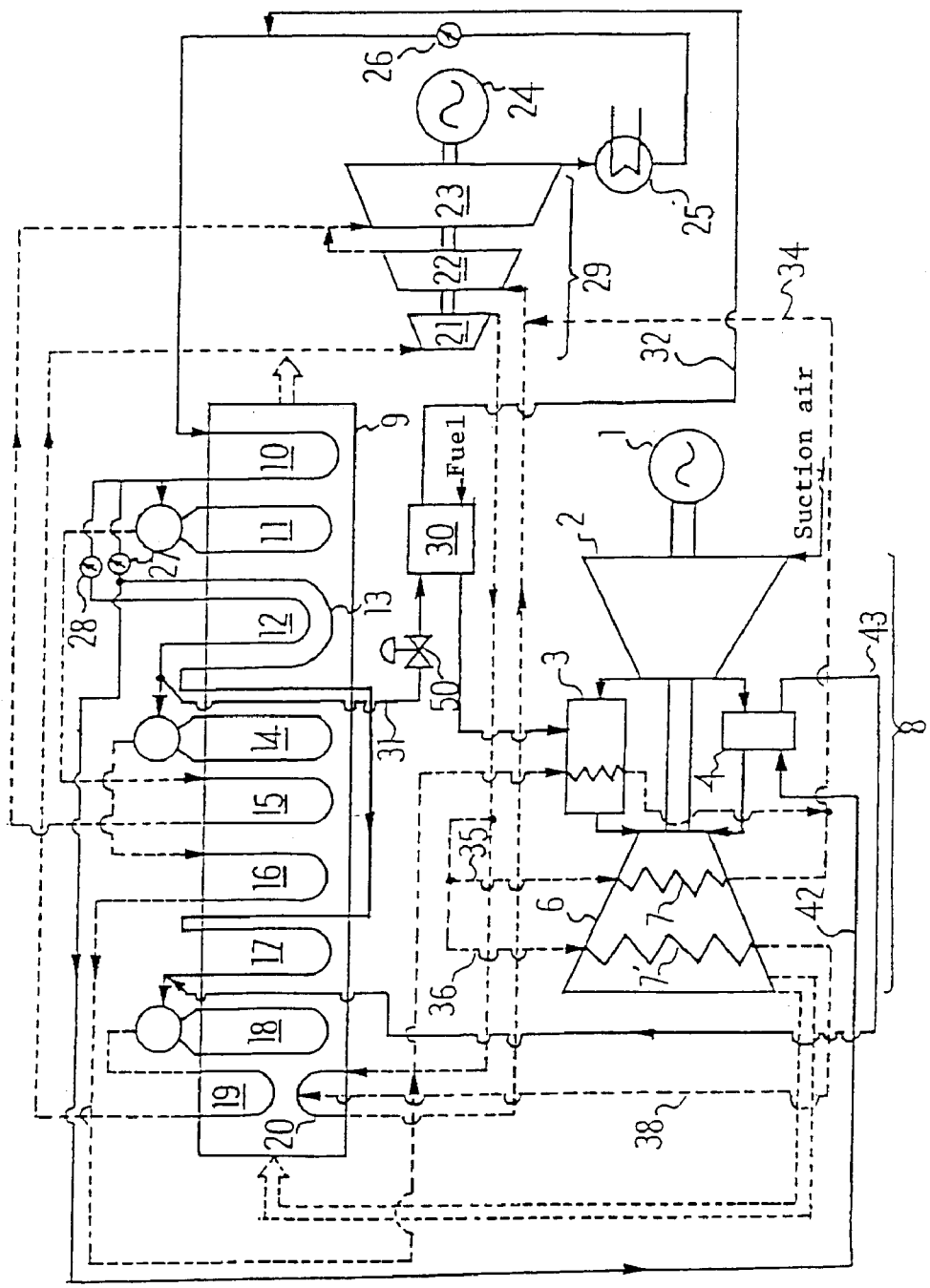
FIG. 11 is a system diagram of a gas turbine combined cycle system of an eleventh embodiment according to the present invention.

FIG. 11 is a system diagram of a gas turbine combined cycle system of an eleventh embodiment according to the present invention. In FIG. 11, the present eleventh embodiment is featured in the portion shown by numerals 42, 43 which are pipings of a cooling system of the blade cooling air cooler 4 to substitute for the air cooling system of the blade cooling air cooler 4 of the third embodiment shown in FIG. 3 as well as featured in the portion shown by numeral 50 which is an opening/closing valve provided in a fuel heating system and construction of the other portion is same as that in the third embodiment shown in FIG. 3. The feature of the pipings 42, 43 and the opening/closing valve 50 will be described below.

While, in the third embodiment shown in FIG. 3, the blade cooling air cooler 4 is cooled by the cooling fan 5, in the present eleventh embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. While, in the heretofore applied cooling system to drive the cooling fan 5, heat of the blade cooling air cooler 4 has been wasted outside, in the present eleventh embodiment employing the mentioned construction, the high pressure steam generated at the waste heat recovery boiler 9 is increased in the quantity and thereby the steam turbine output is increased and both of the combined efficiency and the combined output can be increased. If the fuel is of a high temperature without being preheated or if heating of the fuel is dangerous because of characteristics of the fuel, then the opening/closing valve 50 is closed so that the construction may be made as if no fuel heater 30 is provided.

Figure 12:
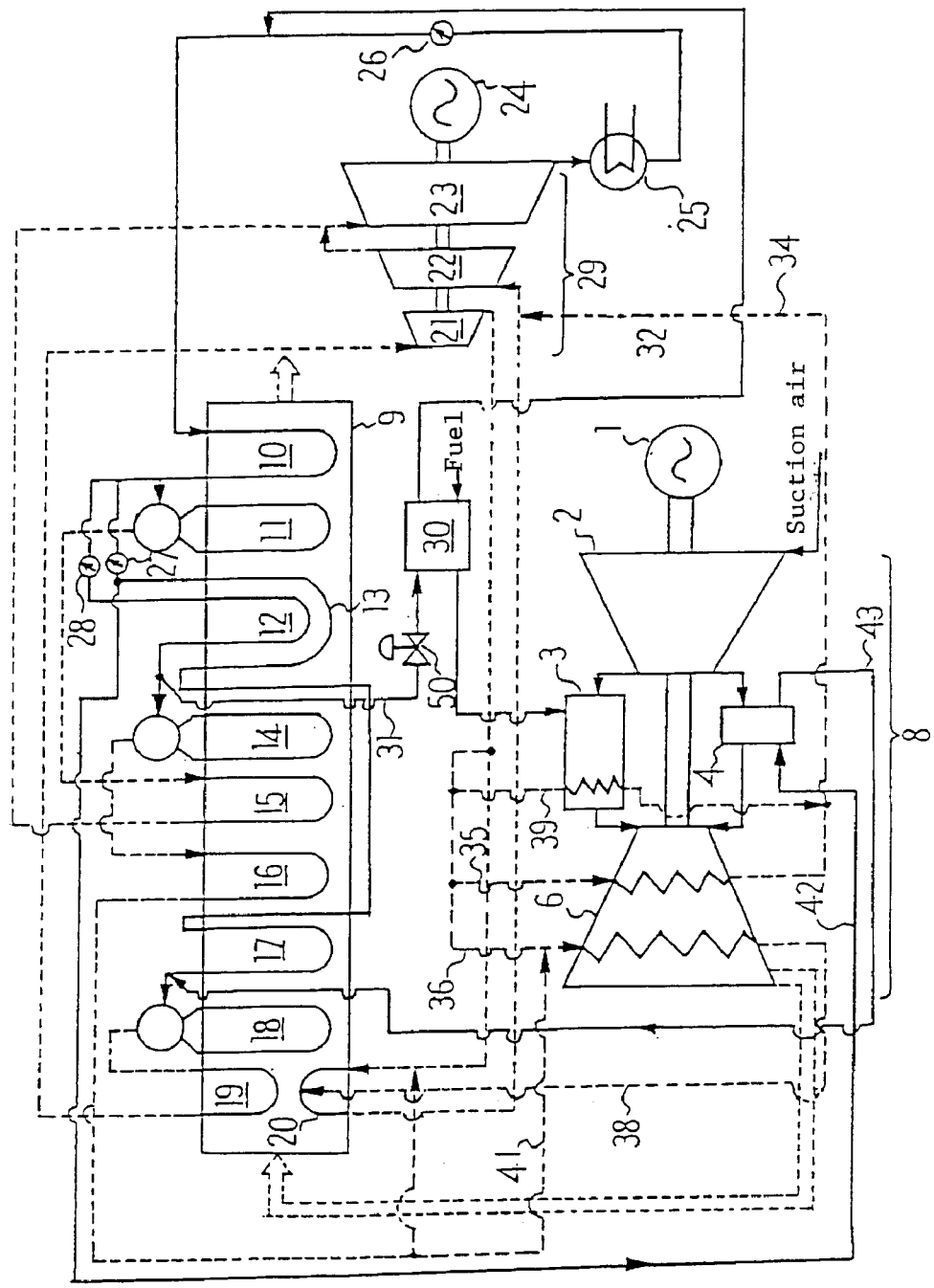
FIG. 12 is a system diagram of a gas turbine combined cycle system of a twelfth embodiment according to the present invention.

FIG. 12 is a system diagram of a gas turbine combined cycle system of a twelfth embodiment according to the present invention. In FIG. 12, the present twelfth embodiment is featured in the portion shown by numerals 42, 43 which are pipings of a cooling system of the blade cooling air cooler 4 to substitute for the air cooling system of the blade cooling air cooler 4 of the fourth embodiment shown in FIG. 4 as well as featured in the portion shown by numeral 50 which is an opening/closing valve provided in a fuel heating system and construction of the other portion is same as that in the fourth embodiment shown in FIG. 4. The feature of the pipings 42, 43 and the opening/closing valve 50 will be described below.

While, in the fourth embodiment shown in FIG. 4, the blade cooling air cooler 4 is cooled by the cooling fan 5, in the present twelfth embodiment, water of about 160° C. at an outlet of the high pressure pump 27 is partially diverged via the piping 42 to be heat-exchanged at the blade cooling air cooler 4. The water after heat-exchanged is heated to about 340° C. and is supplied into the high pressure evaporator 18 via the piping 43. While, in the heretofore applied cooling system to drive the cooling fan 5, heat of the blade cooling air cooler 4 has been wasted outside, in the present twelfth embodiment employing the mentioned construction, the high pressure steam generated at the waste heat recovery boiler 9 is increased in the quantity and thereby the steam turbine output is increased and both of the combined efficiency and the combined output can be increased. If the fuel is of a high temperature without being preheated or if heating of the fuel is dangerous because of characteristics of the fuel, then the opening/closing valve 50 is closed so that the construction may be made as if no fuel heater 30 is provided.

Figure 13:
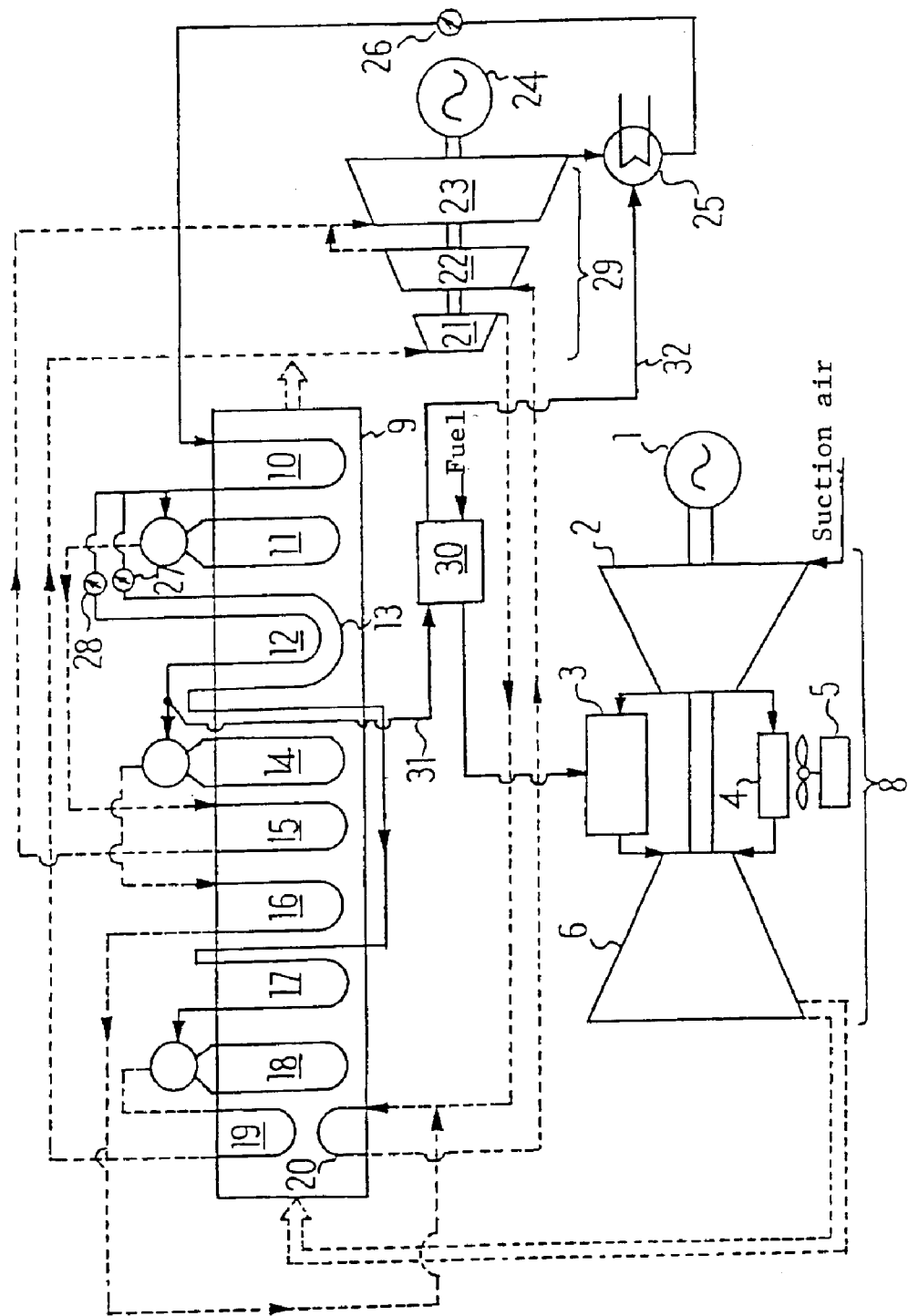
FIG. 13 is a system diagram showing a representative example of modifications of the first to twelfth embodiments according to the present invention.

It is to be noted that, in each of FIGS. 1 to 12, the piping 32 extending from the fuel heater 30 may be connected to the condenser 25 instead of being connected to the feed water heater 10. A representative example of this arrangement is shown in FIG. 13. In FIG. 13, the piping 32 of FIG. 1 is connected to the condenser 25 instead of being connected to the feed water heater 10. Likewise, the pipings 32 of FIGS. 2 to 12, respectively, may be changed to be connected to the condenser 25 but in order to avoid complexity, illustration thereof will be omitted. If the piping 32 is connected to the condenser 25, as the condenser 25 is in a vacuum state of less pressure, flow rate of the saturated water coming into the condenser 25 becomes larger and load of the feed water pump 26 becomes larger. If the piping 32 is connected to the inlet of the feed water heater 10, then the feed water pump 26 receives no large load and an efficiency of the system is improved by that extent.

While the preferred forms of the present invention have been described, it is to be understood that the invention is not limited to the particular constructions and arrangements herein illustrated and described but embraces such modified forms thereof as come within the scope of the appended claims.

What is claimed is:

1. A gas turbine combined cycle system comprising: a steam turbine having a high pressure turbine, an intermediate pressure turbine and a low pressure turbine; a condenser for condensing exhaust steam of the low pressure turbine of the steam turbine; a gas turbine having a compressor for compressing air, a combustor for combusting fuel with the air coming from the compressor and a turbine for expanding a high temperature combustion gas coming from the combustor for driving a generator; a cooling system for cooling the combustor and blades of the turbine; and a waste heat recovery boiler having components including a feed water heater, an intermediate pressure economizer, a low pressure superheater, an intermediate pressure superheater, a high pressure superheater, a high pressure evaporator and a reheater, and being fed with exhaust gas of the gas turbine so that condensed water coming from the condenser is heated and vaporized via the components of the waste heat recovery boiler for supplying steam to the high pressure, intermediate pressure and low pressure turbines, respectively; wherein there is provided a fuel heater for heating the fuel before the fuel enters the combustor, wherein saturated water coming from the intermediate pressure economizer of the waste heat recovery boiler is partially diverted to flow to the fuel heater for heating the fuel, and wherein the saturated water so used for heating the fuel is supplied to an inlet of the feed water heater.

2. A gas turbine combined cycle system as claimed in claim 1, wherein the cooling system for cooling the combustor is fed with steam coming from the intermediate pressure superheater of the waste heat recovery boiler so as to cool a tail tube of the combustor and the steam heated by cooling the tail tube of the combustor is supplied to an inlet of the intermediate pressure of the steam turbine.

3. A gas turbine combined cycle system as claimed in claim 2, wherein the cooling system for cooling the blades of the turbine is supplied with a portion of water at an outlet of the feed water heater of the waste heat recovery boiler by a high pressure pump so that air of the cooling system is cooled, and wherein the water heated by cooling the air is supplied into the high pressure evaporator of the waste heat recovery boiler and the air so cooled is supplied to the blades of the turbine.

4. A gas turbine combined cycle system as claimed in claim 2, wherein there is provided an opening/closing valve in a system for leading the saturated water from the intermediate pressure economizer of the waste heat recovery boiler to the fuel heater, the cooling system for cooling the blades of the turbine is supplied with a portion of water at an outlet of the feed water heater of the waste heat recovery boiler by a high pressure pump so that air of the cooling system is cooled, the water heated by cooling the air is supplied into the high pressure evaporator of the waste heat recovery boiler, and the air so cooled is supplied to the blades of the turbine.

5. A gas turbine combined cycle system as claimed in claim 1, wherein the cooling system, for cooling the combustor, is fed with steam coming from the intermediate pressure superheater of the waste heat recovery boiler so as to cool a tail tube of the combustor and the steam heated by cooling the tail tube of the combustor is supplied to an inlet side of the intermediate pressure turbine of the steam turbine, and wherein the cooling system, for cooling the blades of the turbine, is fed with steam coming from an outlet of the high pressure turbine of the steam turbine so as to cool the blades of the turbine, the steam heated by cooling stationary blades of the turbine is supplied to the inlet side of the intermediate pressure turbine of the steam turbine, and the steam heated by cooling moving blades of the turbine is supplied to the reheater of the waste heat recovery boiler.

6. A gas turbine combined cycle system as claimed in claim 5, wherein the cooling system for cooling the blades of the turbine is supplied with a portion of water at an outlet of the feed water heater of the waste heat recovery boiler by a high pressure pump so that air of the cooling system is cooled, and wherein the water heated by cooling the air is supplied into the high pressure evaporator of the waste heat recovery boiler and the air so cooled is supplied to the blades of the turbine.

7. A gas turbine combined cycle system as claimed in claim 5, wherein there is provided an opening/closing valve in a system for leading the saturated water from the intermediate pressure economizer of the waste heat recovery boiler to the fuel heater, the cooling system for cooling the blades of the turbine is supplied with a portion of water at an outlet of the feed water heater of the waste heat recovery boiler by a high pressure pump so that air of the cooling system is cooled, the water heated by cooling the air is supplied into the high pressure evaporator of the waste heat recovery boiler, and the air so cooled is supplied to the blades of the turbine.

8. A gas turbine combined cycle system as claimed in claim 1, wherein the cooling system for cooling the combustor and the blades of the turbine is fed with steam coming from an outlet of the high pressure turbine of the steam turbine, the steam heated by cooling a tail tube of the combustor and the steam heated by cooling stationary blades of the turbine are supplied to an inlet side of the intermediate pressure turbine of the steam turbine, and the steam heated by cooling moving blades of the turbine is supplied to the reheater of the waste heat recovery boiler, and wherein steam coming from the intermediate pressure superheater of the waste heat recovery boiler is mixed into an inlet of the cooling system for cooling the moving blades of the turbine.

9. A gas turbine combined cycle system as claimed in claim 8, wherein the cooling system for cooling the blades of the turbine is supplied with a portion of water at an outlet of the feed water heater of the waste heat recovery boiler by a high pressure pump so that air of the cooling system is cooled, and wherein the water heated by cooling the air is supplied into the high pressure evaporator of the waste heat recovery boiler and the air so cooled is supplied to the blades of the turbine.

10. A gas turbine combined cycle system as claimed in claim 8, wherein there is provided an opening/closing valve in a system for leading the saturated water from the intermediate pressure economizer of the waste heat recovery boiler to the fuel heater, the cooling system for cooling the blades of the turbine is supplied with a portion of water at an outlet of the feed water heater of the waste heat recovery boiler by a high pressure pump so that air of the cooling system is cooled, the water heated by cooling the air is supplied into the high pressure evaporator of the waste heat recovery boiler, and the air so cooled is supplied to the blades of the turbine.

11. As gas turbine combined cycle system as claimed in claim 1, wherein the cooling system for cooling the blades of the turbine is supplied with a portion of water at an outlet of the feed water heater of the waste heat recovery boiler by a high pressure pump so that air of the cooling system is cooled, and wherein the water heated by cooling the air is supplied into the high pressure evaporator of the waste heat recovery boiler.

12. A gas turbine combined cycle system as claimed in claim 1, wherein there is provided an opening/closing valve in a system for leading the saturated water from the intermediate pressure economizer of the waste heat recovery boiler to the fuel heater, the cooling system for cooling the blades of the turbine is supplied with a portion of water at an outlet of the feed water heater of the waste heat recovery boiler by a high pressure pump so that air of the cooling system is cooled, and the water heated by cooling the air is supplied into the high pressure evaporator of the waste heat recovery boiler.

13. A gas turbine combined cycle system comprising: a steam turbine having a high pressure turbine, an intermediate pressure turbine and a low pressure turbine; a condenser for condensing exhaust steam of the low pressure turbine of the steam turbine; a gas turbine having a compressor for compressing air, a combustor for combusting fuel with the air coming from the compressor and a turbine for expanding a high temperature combustion gas coming from the combustor for driving a generator; a cooling system for cooling the combustor and blades of the turbine; and a waste heat recovery boiler having components including a feed water heater, an intermediate pressure economizer, a low pressure superheater, an intermediate pressure superheater, a high pressure superheater, a high pressure evaporator and a reheater and being fed with exhaust gas of the gas turbine so that condensed water coming from the condenser is heated and vaporized via the components of the waste heat recovery boiler for supplying steam to the high pressure, intermediate pressure and low pressure turbines, respectively; wherein there is provided a fuel heater for heating the fuel before the fuel enters the combustor, wherein saturated water coming from the intermediate pressure economizer of the waste heat recovery boiler is partially diverted to flow to the fuel heater for heating the fuel, and wherein the saturated water so used for heating the fuel is supplied to the condenser.

14. A gas turbine combined cycle system as claimed in claim 13, wherein the cooling system for cooling the combustor is fed with steam coming from the intermediate pressure superheater of the waste heat recovery boiler so as to cool a tail tube of the combustor and the steam heated by cooling the tail tube of the combustor is supplied to an inlet of the intermediate pressure turbine of the steam turbine.

15. A gas turbine combined cycle system as claimed in claim 13, wherein the cooling system, for cooling the combustor, is fed with steam coming from the intermediate pressure superheater of the waste heat recovery boiler so as to cool a tail tube of the combustor and the steam heated by cooling the tail tube of the combustor is supplied to an inlet side of the intermediate pressure turbine of the steam turbine, and wherein the cooling system, for cooling the blades of the turbine, is fed with steam coming from an outlet of the high pressure turbine of the steam turbine so as to cool the blades of the turbine, the steam heated by cooling stationary blades of the turbine is supplied to the inlet side of the intermediate pressure turbine of the steam turbine, and the steam heated by cooling moving blades of the turbine is supplied to the reheater of the waste heat recovery boiler.

16. A gas turbine combined cycle system as claimed in claim 13, wherein the cooling system for cooling the combustor and the blades of the turbine is fed with steam coming from an outlet of the high pressure turbine of the steam turbine, the steam heated by cooling a tail tube of the combustor and the steam heated by cooling stationary blades of the turbine are supplied to an inlet side of the immediate pressure turbine of the steam turbine, and the steam heated by cooling moving blades of the turbine is supplied to the reheater of the waste heat recovery boiler, and wherein steam coming from the intermediate pressure superheater of the waste heat recovery boiler is mixed into an inlet of the cooling system for cooling the moving blades of the turbine.

17. As gas turbine combined cycle system as claimed in claim 13, wherein the cooling system for cooling the blades of the turbine is supplied with a portion of water at an outlet of the feed water heater of the waste heat recovery boiler by a high pressure pump so that air of the cooling system is cooled and the water heated by cooling the air is supplied into the high pressure evaporator of the waste heat recovery boiler.

18. A gas turbine combined cycle system as claimed in claim 13, wherein there is provided an opening/closing valve in a system for leading the saturated water from the intermediate pressure economizer of the waste heat recovery boiler to the fuel heater, the cooling system for cooling the blades of the turbine is supplied with a portion of water at an outlet of the feed water heater of the waste heat recovery boiler by a high pressure pump so that air of the cooling system is cooled, and the water heated by cooling the air is supplied into the high pressure evaporator of the waste heat recovery boiler.

* * * * *